United States Patent [19]

Hoover et al.

[11] Patent Number: 5,273,834
[45] Date of Patent: Dec. 28, 1993

[54] DISCS FOR MEMORY STORAGE DEVICES

[75] Inventors: Herbert L. Hoover, Big Flats; Roger A. Miller, Painted Post; Linda R. Pinckney; Brent M. Wedding, both of Corning, all of N.Y.

[73] Assignee: Corning Incorporated, Corning, N.Y.

[21] Appl. No.: 8,471

[22] Filed: Jan. 25, 1993

[51] Int. Cl.$^5$ ............................................. C03C 10/14
[52] U.S. Cl. ........................... 428/694 ST; 428/66; 428/426; 501/3; 501/32
[58] Field of Search ............... 428/66, 426, 692, 693, 428/694 ST, 694 XS, 701, 702, 900; 501/3, 4, 17, 32

[56] References Cited

U.S. PATENT DOCUMENTS

| | | | |
|---|---|---|---|
| 2,938,808 | 5/1960 | Duncan et al. | 106/52 |
| 3,326,703 | 5/1963 | Harrington | 106/54 |
| 3,649,311 | 3/1972 | Araujo | 106/54 |
| 3,672,919 | 6/1972 | Sack | 106/52 |
| 3,689,293 | 9/1972 | Beall | 106/39 |
| 3,698,921 | 10/1972 | LaGrouw et al. | 106/54 |
| 3,732,087 | 5/1973 | Grossman | 65/33 |
| 3,779,733 | 12/1973 | Janakirama-Rao | 106/52 |
| 3,966,447 | 6/1976 | Asahara et al. | 106/47 |
| 4,007,048 | 2/1977 | Sack et al. | 106/39.7 |
| 4,192,688 | 3/1980 | Babcock et al. | 106/39.7 |
| 4,386,162 | 5/1983 | Beall | 501/3 |
| 4,461,839 | 7/1984 | Rittler | 501/4 |
| 4,467,039 | 8/1984 | Beall et al. | 501/3 |
| 4,608,348 | 8/1986 | Beall et al. | 501/3 |
| 4,971,932 | 11/1990 | Alpha et al. | 501/3 |
| 5,070,044 | 12/1991 | Pinckney | 501/3 |

OTHER PUBLICATIONS

S. L. Duan et al., "Study of the Growth Characteristics of Sputtered Cr Thin Films", *Journal of Applied Physics*, 67, (9), pp. 4913-15, May 1, 1990.

Primary Examiner—Karl Group
Assistant Examiner—Chris Gallo
Attorney, Agent, or Firm—C. S. Janes, Jr.

[57] ABSTRACT

This invention is directed to the fabrication of magnetic memory storage devices which consist essentially of a head pad and a rigid information disc, that disc consisting essentially of a rigid substrate having a layer of magnetic media joined to the surface of said substrate through an underlayer. The invention is particularly drawn to the substrate for the information disc which is composed of a glass-based material containing 0.05-2% by weight total of cobalt oxide and/or iron oxide and/or nickel oxide. The most preferred glass-based material comprises a glass-ceramic wherein canasite constitutes the predominant crystal phase.

22 Claims, 1 Drawing Sheet

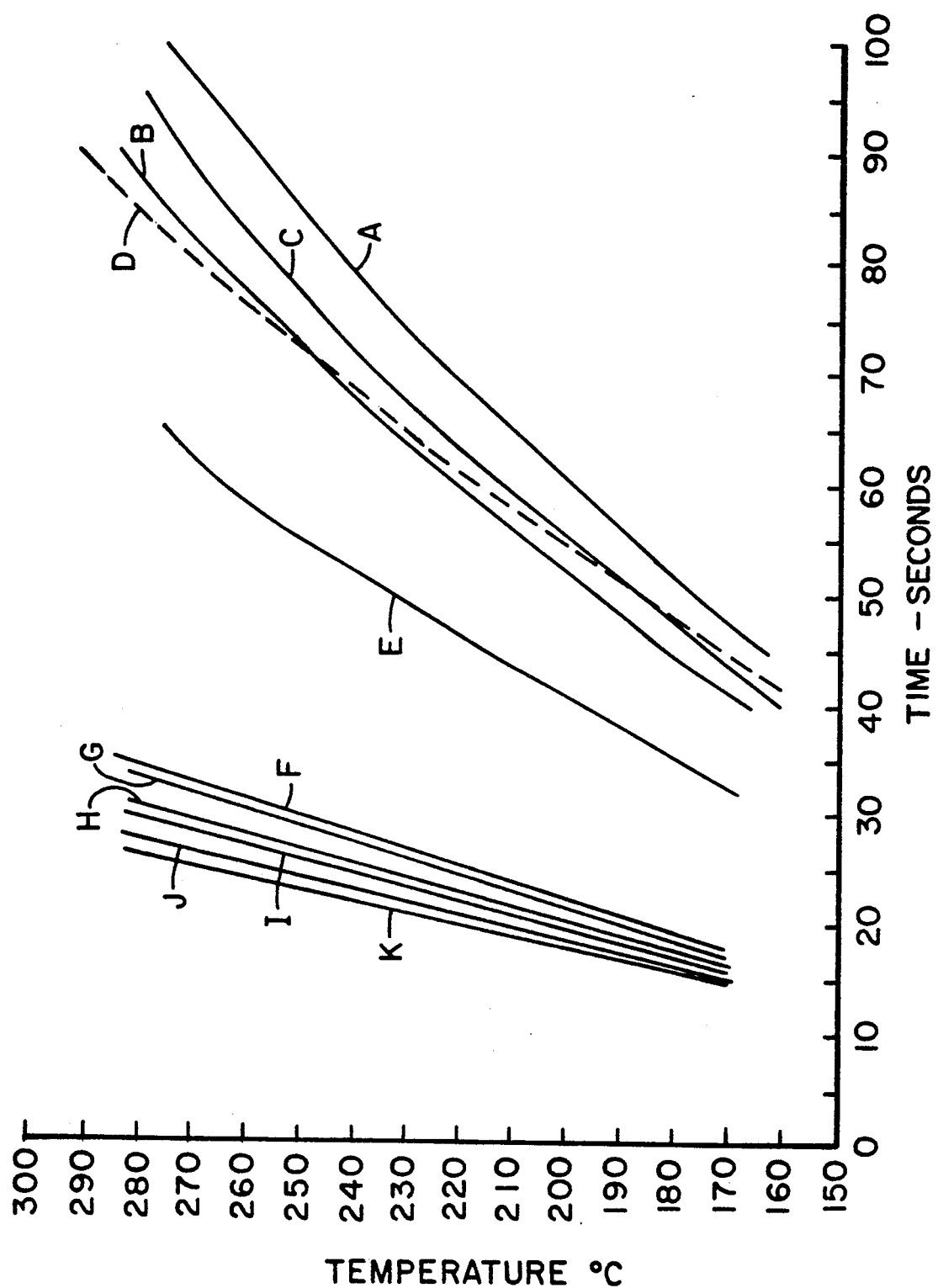

DISCS FOR MEMORY STORAGE DEVICES

BACKGROUND OF THE INVENTION

U.S. Pat. No. 4,971,932 (Alpha et al.) is generally related to the construction of magnetic memory storage devices, the essential components of which are a head pad and a rigid information disc. As is described in that patent, the information disc consists of two basic elements: (a) a rigid substrate, and (b) a coating of magnetic media on the surface of the substrate facing the head pad. The disclosure of that patent is directed specifically to the composition and structure of the rigid substrate.

Thus, the inventive concept encompassed within the patent comprised the fabrication of the substrate from two different groups of glass-ceramic materials:

(1) glass-ceramics wherein crystals exhibiting a sheet silicate structure constitute the predominant crystal phase; and (2) glass-ceramics wherein crystals exhibiting a chain silicate structure constitute the predominant crystal phase.

The patent cited seven characteristics of those glass-ceramics which rendered them especially suitable for high performance rigid disc substrates:

(a) high body strengths and fracture toughnesses, as evidenced by moduli of rupture between about 15,000–40,000 psi (~105-280 MPa) and $K_{IC}$ values between about 3-5 MPa$\sqrt{m}$, respectively;

(b) an elastic modulus at least equal to, and preferably higher than that of aluminum metal (nickel phosphorus plated aluminum substrates have been used extensively in information discs) such that the material is dimensionally stable at all thicknesses and rotational velocities;

(c) a high surface hardness to impart excellent scratch resistance;

(d) the capability of forming precision surfaces (flat and smooth);

(e) a linear coefficient of thermal expansion between about $75-125 \times 10^{-7}/°C$. over the temperature range of 25°–300° C.;

(f) excellent resistance to attack in moist environments; and (g) an inherently textured surface of a desired roughness ($R_a=0.5-5$ nm) for enhanced magnetics and lower flying height.

As was disclosed in U.S. Pat. No. 4,971,932, two composition areas within the general system yielding glass-ceramics containing synthetic fluormica crystals with sheet silicate structures have been investigated for their utility as substrates in rigid information discs: (a) compositions wherein fluorophlogopite solid solution comprises the predominant crystal phase, and (b) compositions wherein tetrasilicic fluormica constitutes the predominant crystal phase.

U.S. Pat. No. 3,689,293 (Beall) discloses the preparation of glass-ceramic articles wherein fluorophlogopite solid solution comprises the predominant crystal phase, those articles being suitable for the fabrication of substrates for rigid information discs. Those glass-ceramics consist essentially, expressed in terms of weight percent on the oxide basis, of:

| | | | |
|---|---|---|---|
| $SiO_2$ | 25–60 | $Cs_2O$ | 0–20 |
| $B_2O_3$ | 5–15 | $Na_2O + K_2O + Rb_2O + Cs_2O$ | 2–20 |
| $Al_2O_3$ | 5–25 | MgO | 4–25 |
| $B_2O_3 + Al_2O_3$ | 15–35 | $Li_2O$ | 0–7 |
| $Na_2O$ | 0–15 | $MgO + Li_2O$ | 6–25 |
| $K_2O$ | 0–15 | F | 4–20 |
| $Rb_2O$ | 0–15 | | |

One glass-ceramic having a composition coming within the above ranges which has been found useful for forming substrates for rigid information discs is a product marketed commercially by Corning Incorporated, Corning, N.Y. as Corning 9658 under the trademark MACOR. That glass-ceramic has the following approximate composition (O=F is the oxygen=fluoride correction factor):

| | | | |
|---|---|---|---|
| $SiO_2$ | 47.0 | $K_2O$ | 9.5 |
| $B_2O_3$ | 8.5 | F | 6.3 |
| $Al_2O_3$ | 16.7 | O=F | 2.5 |
| MgO | 14.5 | | |

U.S. Pat. No. 3,732,087 (Grossman) discloses the preparation of glass-ceramic articles wherein tetrasilicic fluormica comprises the predominant crystal phase, those articles also being suitable for the formation of substrates for rigid information discs. Those glass-ceramics consist essentially, expressed in terms of weight percent on the oxide basis, of 45–70% $SiO_2$, 8–20% MgO, 8–15% $MgF_2$, 5–25% $R_2O$, wherein $R_2O$ consists of 0–20% $K_2O$, 0–20% $Rb_2O$, and 0–20% $Cs_2O$, 0–20% RO, wherein RO consists of 0–20% SrO, 0–20% BaO, and 0–20% CdO, and 5–35% $R_2O+RO$.

The preparation of substrates for rigid information discs from glass-ceramics containing a chain silicate as the predominant crystal phase has been preferred, however, and of such glass-ceramics three specifically-defined composition areas have been found to be particularly effective:

(1) glass-ceramics wherein canasite constitutes the predominant crystal phase;

(2) glass-ceramics wherein potassium fluorrichterite constitutes the predominant crystal phase; and (3) glass-ceramics wherein potassium fluorrichterite constitutes the predominant crystal phase, but wherein a substantial amount of cristobalite is also present.

Thus, highly crystalline glass-ceramics consisting of randomly-oriented, tightly interlocked, high aspect ratio crystals of canasite or fluorrichterite are produced by means of the controlled nucleation and crystallization of precursor glasses of predetermined compositions. It is the crystalline microstructure of these glass-ceramics which imparts the very high strength and toughness thereto, as well as a surface texture of desirable roughness.

U.S. Pat. No. 4,386,162 (Beall) describes the formation of glass-ceramic bodies containing canasite and/or agrellite and/or fedorite as the predominant crystal phase. Glass-ceramics satisfying the seven criteria set forth above for substrates of rigid information discs have been prepared via heat treatment of parent glass bodies having the following compositions, expressed in terms of weight percent on the oxide basis, yielding articles wherein canasite comprises the predominant crystal phase:

| | | | |
|---|---|---|---|
| $SiO_2$ | 50–70 | F | 4–9 |
| CaO | 15–25 | MgO | 0–2 |

| | | | |
|---|---|---|---|
| Na$_2$O | 6–10 | ZnO | 0–2 |
| K$_2$O | 6–12 | SnO$_2$ | 0–2 |
| Al$_2$O$_3$ | 1–4 | Sb$_2$O$_3$ | 0–1 |

U.S. Pat. No. 4,467,039 (Beall et al.) discloses glass-ceramics wherein potassium fluorrichterite constitutes the predominant crystal phase. Glass-ceramics encompassed within that disclosure satisfying the above criteria have been produced through heat treating glass articles having compositions within the intervals below, expressed in terms of weight percent on the oxide basis, to form articles wherein potassium fluorrichterite comprises essentially the sole crystal phase:

| | | | |
|---|---|---|---|
| SiO$_2$ | 58–70 | K$_2$O | 3.8–7 |
| Al$_2$O$_3$ | 0.5–3 | Li$_2$O | 0.5–2 |
| MgO | 13–17.5 | BaO | 0–2.5 |
| CaO | 3–7 | P$_2$O$_5$ | 0–2.5 |
| Na$_2$O | 1.5–4 | F | 3–5.5 |

U.S. Pat. No. 4,608,348 (Beall et al.) discusses glass-ceramics containing potassium fluorrichterite as the predominant crystal phase, but which also contain at least 10% of cristobalite crystallization. Glass-ceramics included within that disclosure satisfying the above criteria have been developed through the heat treatment of precursor glass articles having the compositions recited below, expressed in terms of weight percent on the oxide basis, of:

| | | | |
|---|---|---|---|
| SiO$_2$ | 65–69 | K$_2$O | 4.2–6 |
| Al$_2$O$_3$ | 0.75–3 | Li$_2$O | 0.5–2 |
| MgO | 13.5–16.5 | BaO | 0–2 |
| CaO | 3–4.8 | P$_2$O$_5$ | 0–2 |
| Na$_2$O | 1.5–3.3 | F | 3.3–5 |

Whereas glass-ceramics satisfying the seven criteria for substrates to be used in rigid information discs have been prepared and tested from each of the three above-described composition families, glass-ceramics wherein canasite constitutes the predominant crystal phase have been adjudged to be the most preferred for that application.

As is explained in U.S. Pat. No. 4,971,932, the conventional rigid information disc comprises a laminate consisting of at least three layers, viz., a substrate and a layer of magnetic alloy joined to the substrate through an undercoat. Protective and/or lubricating coatings are customarily applied over the layer of magnetic alloy. These layers are collectively termed "media". Cobalt-based alloys have typically comprised the magnetic media and a chromium film sputtered onto the substrate has commonly constituted the underlayer. The substrate most commonly used commercially has comprised a thin disc of aluminum metal. Prior to applying the layers of media, the aluminum substrate must be carefully processed (including electroless NiP plating) to assure flat, non-corroding surfaces with precisely controlled textures.

In addition to the fact that those multi-step processes incur added expense and process control requirements, some inherent limitations of aluminum-based substrates have led media and disc drive manufacturers to look to potential alternative substrate materials, in particular glasses and glass-ceramics. Recognized limitations of aluminum alloys include a tendency toward corrosion if there are any flaws in the protective NiP coating, as well as a minimum disc thickness limitation due to the ease with which aluminum bends because of its ductility and malleability. Alternative materials can offer a number of advantages over aluminum-based substrates, including fewer process steps (no NiP coatings are demanded, for example) and the ability to be mass produced with very flat, smooth, and uniform surfaces.

The canasite-containing glass-ceramic materials referred to above in U.S. Pat. No. 4,386,162 offer a unique set of properties for the substrate application. Their relatively high elastic moduli, coupled with high body strength and toughness, permit the manufacture and use of exceedingly thin (<0.5 mm), yet rugged parts. Furthermore, their microstructures provide an inherent tailorable surface texture. Thus, neither NiP coatings nor separate texturizing processes are required and the substrate is reworkable, i.e., the magnetic coatings may be removed and the disc re-processed, each of those factors involving significant cost savings.

One problem that has been encountered with discs utilizing substrates prepared from any glass-based materials has been the difficulty in achieving optimal magnetic performance. Thus, coercivities of magnetic films processed in the same manner onto glass-based discs have typically been about 10% lower than those measured on discs using NiP-plated aluminum substrates. Laboratory investigation has demonstrated that this difference in magnetic properties is a function of the difference in thermal properties existing between aluminum metal and glass-based materials. That is, glass-based materials do not achieve the same temperature as aluminum-based materials at the film deposition station, the significance of that factor being explained below.

Extensive field experience has demonstrated that the performance of the cobalt-based alloys, i.e., their coercivity, high frequency signal amplitude, bit shift, pulse width, and signal-to-noise ratio thereof, is dependent upon the orientation of the cobalt-based alloy. That orientation can be controlled through the orientation of the chromium underlayer. It has been found that the optimum performance of the cobalt-based alloy takes place when the texture of the chromium film is (100). [S. L. Duan et al., "Study of the Growth Characteristics of Sputtered Cr Thin Films", *Journal of Applied Physics*, 67, (9), pp. 4913-15, May 1, 1990] The crystallographic orientation of the chromium film, however, is dependent upon the temperature of the substrate during deposition thereof, and, for the film thicknesses conventionally employed in underlayers, the texture becomes predominantly (100) when the temperature of the substrate exceeds 200° C. Consequently, a substrate temperature above 200° C. at the time the chromium coating is applied comprises a prerequisite for achieving satisfactory magnetic performance from cobalt-based alloys irrespective of the substrate composition.

In many of the conventional commercial production processes for preparing rigid information discs, heating of the substrate is accomplished via the absorption of radiation from a tungsten-halogen lamp in a vacuum system. Nickel phosphorus plated aluminum (NiP/Al) substrates can be heated in this manner to temperatures in excess of 220° C. in less than about 15 seconds. Depending upon its microstructure, the amount of radiation absorbed from such a lamp by canasite can be substantially less than that absorbed by NiP/Al. Accordingly, in any given apparatus, canasite can require longer heating times. In addition, cooling of the substrate which occurs during film processing/deposition as the substrate is transferred from the heating station to the deposition station in commercial sputtering units is greater for substrates prepared from glasses or glass-ceramic than from NiP/Al-based substrates. And, inasmuch as media suppliers are quite reluctant to alter their processes, in particular to processes which require longer periods of time and, consequently, add cost, acceptance in the marketplace of glass-based materials in the fabrication of substrates for rigid information discs has been limited, even though they exhibit several properties superior to those found in NiP/Al.

Therefore, the principal objective of the present invention was to develop means for making glass-based materials capable of attaining temperatures similar to those attained by NiP/Al during deposition of the film.

A specific objective of the present invention was to develop means for making canasite-containing glass-ceramic substrates for rigid information discs having the capability of attaining temperatures similar to that of NiP/Al substrates during deposition of the film and to retain that temperature in a manner similar to NiP/Al substrates.

SUMMARY OF THE INVENTION

Measurements of radiant energy have indicated that, at source temperatures of 1600° C. and higher, at least 90% of the energy is radiated at wavelengths shorter than 5 μm. The silica glass envelope of the quartz-halogen lamp absorbs the remaining longer wavelength radiation. Many glass-based materials, including glass-ceramics containing sheet silicates or chain silicates as the predominant crystal phase, are highly absorbing of radiant energy only at the longer wavelengths which are filtered by the silica glass envelope. In contrast, radiant energy measurements have indicated that the NiP/Al disc absorbs over 25% of the shorter wavelength radiation; which absorption can result in the NiP/Al disc heating up much more rapidly than a glass-based disc.

As was remarked above, glass and glass-ceramic substrates cool more rapidly than those fashioned from NiP/Al. It was conjectured that, if the initial temperature of the substrate material could be increased without extending the time required for heat up and without thermally deforming the substrate or altering the basic properties thereof, then the faster cooling rate could be compensated for.

As a result of that conjecture, a research program was initiated to provide means for sharply increasing the absorptance of glass-based materials and, in particular, canasite and potassium fluorrichterite-containing glass-ceramic materials in the near infrared portion of the radiation spectrum; viz., that portion of the spectrum having the greatest amount of energy. The overall goal of the research program was to design materials which would be operable in the standard process for preparing rigid information discs, viz., to demonstrate the time and temperature parameters required in the standard process, but without significantly affecting the basic properties of the glass-based materials. We have accomplished that goal by incorporating closely controlled amounts of ions which absorb radiation in the near infrared portion of the spectrum into the glass-based compositions. The concentrations of the additives are carefully restricted to achieve the desired absorptance without encountering thermal shock breakage of the disc due to thermal gradients, while avoiding problems in melting and forming the precursor glass and/or altering the crystal structure and/or the physical and chemical characteristics of the glass or glass-ceramic material.

In our investigations discs were heated in high vacuum by means of an electrically powered radiant heater. The rate at which the temperature of the discs is raised is strongly dependent upon the radiant absorption and reflection spectra of the discs and the power spectrum of the heater.

The fraction of radiant energy from the heater that is absorbed by the disc can be calculated if the spectral absorptance, a, of the object is known. That value is determined by measuring the spectral transmittance, t, the spectral reflectance, r, and then incorporating those three values in the conservation of energy equation: $a+t+r=1$. For polished surfaces of NiP/Al or glass which exhibit minimal light scattering, accurate spectrophotometric measurements of r and t are easily accomplished. The spectral irradiance spectrum of the heater is determined from blackbody theory. A sum over all the wavelengths of the fraction of available energy absorbed in each wavelength interval is used to find the total absorptance by the article for a chosen source temperature. To calculate relative cooling rates, the spectral emittance (numerically equivalent to the spectral absorptance) is used with the blackbody temperature distribution for the sample temperature.

Radiant energy in equilibrium with a perfectly absorbing body at a particular temperature is known as blackbody radiation. The energy density is proportional to the fourth power of the temperature. The wavelength distribution of energy is a continuum, with the wavelength for the energy peak varying inversely with temperature. The product of the temperature and peak wavelength is found to be constant. It has also been found that 25% of the total energy always occurs at wavelengths shorter than that of the peak. As can be appreciated, blackbody energy distribution is strictly accurate only for materials that are perfectly absorbing at all wavelengths. For real materials non-zero values of reflectance and/or transmittance have to be taken into account. The variation of energy distribution with temperature becomes very important when dealing with real materials having absorption and reflection characteristics which are wavelength dependent.

Because, as was observed above, the silica glass envelope of the tungsten-halogen lamp absorbs most of the infrared radiation of wavelengths longer than 5 μm, means were sought to increase the heating rate of the canasite-containing glass-ceramic materials by increasing the absorptance of those materials in the near infrared portion of the radiation spectrum where most of the source energy is located. The use of transition metal ions such as cobalt, iron, nickel, and vanadium ions as colorants and as heat absorbing agents in glass compositions is well recognized in the glass art; see, e.g., U.S. Pat. No. 2,938,808 (Duncan et al.), U.S. Pat. No. 3,672,919 (Sack), U.S. Pat. No. 3,779,733 (Janakirama-Rao), and U.S. Pat. No. 3,966,447 (Asahara et al.). The ferrous ion has been utilized extensively in the glass art because it supplies a strong, broad band absorption in the near infrared portion of the radiation spectrum.

The transition metal ions have likewise been utilized in colorants in glass-ceramic articles; see for example, U.S. Pat. No. 4,007,048 (Sack et al.), U.S. Pat. No. 4,461,839 (Rittler), U.S. Pat. No. 4,192,688 (Babcock et al.) and U.S. Pat. No. 5,070,044 (Pinckney). However, unlike glass bodies wherein the ions are essentially uniformly dispersed throughout, the place assemblage of a glass-ceramic can result in particular ions being present in the crystal phase and/or in the glass phase, with the behavior of the ions being influenced by their site in either the crystal phase or the glass phase. For example, ions constituting part of a crystal lattice can be constrained from exhibiting the behavior demonstrated when present in a glass. Accordingly, because of the likelihood of transition metal ions entering into the structure of canasite $[Ca_5Na_4K_2(Si_{12}O_{30})F_4]$ with probable solid solution to $[Ca_5Na_3K_3(Si_{12}O_{30})F_4]$ or into the structure of potassium fluorrichterite $KNaCaMg_5Si_8O_{22}F_2$, its effectiveness in absorbing infrared radiation, particularly in the near infrared portion of the radiation spectrum, was in doubt. That is, would such large additions of transition metal ions be required to achieve the required deposition temperature that the physical properties of the canasite- and potassium fluorrichterite-containing glass-ceramics would be unduly modified? Or, would such large additions of transition metal ions be required that melting of the batch for the precursor glass be deleteriously affected?

In addition, and contrary to the situation with respect to NiP/Al or glass bodies, measurements of infrared reflectance and transmittance made on glass-ceramic articles are difficult to use in calculating comparative heating and cooling. This difficulty results from light scattering taking place because of the microstructure present in the latter articles, which microstructure consists of crystals dispersed in a residual glassy matrix, the crystals constituting the greater proportion of the glass-ceramic articles.

To circumvent the difficulties and complications faced in measuring and analyzing infrared reflectance and transmittance of glass-ceramic articles, experiments were conducted wherein comparative heating and cooling responses of NiP/Al and glass-ceramics were determined in a high vacuum. The heat source consisted of two 500 watt tungsten halogen lamps whose radiation was incident on one side of the sample. The thermometer comprised a remote sensing thermocouple of suitable design.

Laboratory investigations have determined that the incorporation of no more than about 0.05% by weight total of at least one metal oxide selected from the group consisting of cobalt oxide, iron oxide, and nickel oxide to glass-based materials boosts the energy absorptance of those materials to such a degree that rigid information discs for memory storage devices utilizing those materials as substrates therefor can be heated rapidly to temperatures in excess of 220° C. Indeed, those materials heat up more rapidly than NiP/Al materials. In general, minimum levels of dopant ranging about 0.1–0.2% will be incorporated into the glass composition to assure the desired rapid heat up. Much greater total concentrations of dopant(s) can be included, e.g., 2% or more, but with no substantive advantages flowing therefrom. Moreover, high levels of dopant may lead to problems in melting the glass and adverse effects upon the properties of the glass-based materials. Therefore, an upper limit of 2% has been deemed to constitute a practical maximum with additions of 0.2–0.5% being preferred.

BRIEF DESCRIPTION OF THE DRAWING

The appended drawing presents curves illustrating the rates of heat up of the inventive materials and NiP/Al materials when exposed to a heat source comprising two 500 watt tungsten halogen lamps whose radiation was incident on one side of the sample.

DESCRIPTION OF PREFERRED EMBODIMENTS

Because the most preferred embodiment of the present invention consists of substrates for rigid information discs used in memory storage devices prepared from glass-ceramic materials wherein canasite constitutes the predominant crystal phase and iron oxide and/or nickel oxide and/or cobalt oxide comprise the infrared radiation absorbing agent, the following description will be concentrated on compositions designed to produce such materials. Nevertheless, operable glass compositions in the soda lime silicate field, the alkali metal aluminosilicate field, and the alkali metal borosilicate field are also provided.

TABLE I records a number of glass compositions, expressed in terms of parts by weight on the oxide basis, illustrating the present invention. Because it is not known with which cation(s) the fluoride is combined, it is merely reported as fluoride and the fluoride oxygen correction factor supplied for the base composition therefor. The $Fe_3O_4$, $Co_3O_4$, and NiO were added in addition to the base glass composition. Furthermore, because the sum of the individual components of the recited compositions totals or closely approximates 100, for all practical purposes the tabulated values may be considered to represent weight percent. The batch ingredients, themselves, may comprise any materials, either the oxides or other compounds, which, when melted together, will be converted into the desired oxide in the proper proportions. For example, $Na_2CO_3$ may provide the source of $Na_2O$ and the minerals limestone and aragonite may comprise sources of CaO. The aragonite employed in the following examples contained a small amount (<0.1%) sulfur trioxide as an impurity. To determine the effect of redox conditions, in certain examples part of the $Na_2O$ content was added in the form of $NaNO_3$ in a proportion of 27 parts/1000 parts batch to achieve an oxidizing environment during melting. Where that proportion of $NaNO_3$ was incorporated, the $Na_2O$ content is designated with a N. Where aragonite constituted the source of CaO, the CaO content is designated with an A; where limestone formed the source of CaO, the CaO concentration is designated with a L. To assure reducing conditions during melting, sucrose was added to several of the batches. In each example where present, the iron oxide, nickel oxide, and cobalt oxide, the $NaNO_3$, and the sugar were added in addition to the base glass composition. $Sb_2O_3$ performed its customary function as a fining agent.

The batch constituents were compounded, ballmilled together to aid in obtaining a homogeneous melt, and charged into platinum crucibles. Lids were placed upon the crucibles and the crucibles were moved into a furnace operating at about 1325° C. After about three hours the crucibles were withdrawn from the furnace, the melts were poured onto a steel plate, and the resulting glass slabs were transferred immediately to an annealer operating at about 500° C.

Samples having dimensions of about 2"×2"×0.25" (~5.1×5.1×0.6 cm) were prepared from each annealed slab and introduced into an electrically heated furnace and subjected to the following heat treatment (unless otherwise specified):

Room temperature to 850° C. at 300° C./hour;

Hold at 850° C. for 1 hour;
Cool to room temperature at furnace rate.

The resulting glass-ceramic bodies were highly crystalline with canasite (average size in longest dimension of about 5 μm) constituting essentially the sole crystal phase.

The base glass composition is reported below in terms of weight percent:

| | |
|---|---|
| $SiO_2$ | 57.3 |
| CaO | 20.2 |
| $Na_2O$ | 8.0 |
| $K_2O$ | 8.8 |
| $Al_2O_3$ | 2.0 |
| F | 6.3 |
| | 102.6 |
| F=O | −2.6 |
| | 100.0 |

Table I below reports additions of $Fe_3O_4$, $Fe_2O_3$, $Co_3O_4$, and NiO along with notations of whether a portion of the $Na_2O$ content comprised $NaNO_3$, whether sucrose was added, and whether aragonite or limestone provided the source of CaO. The table also records the transmittances of the precursor glasses and the crystallized glass-ceramics at wavelengths of 1100 and 1800 nm, respectively, as measured on samples with polished surfaces having the dimensions of 1"×1"×1 mm (~25.4×25.4×1 mm).

TABLE I

| | 1 | 2 | 3 | 4 | 5 | 6 |
|---|---|---|---|---|---|---|
| $Fe_3O_4$ | — | 0.5 | — | — | — | — |
| NiO | — | — | 0.1 | 0.1 | 0.2 | 0.2 |
| $Na_2O$ | — | — | — | — | — | — |
| Sucrose | — | 0.5 | — | — | — | — |
| CaO | A | A | A | L | L | A |
| $Sb_2O_3$ | 0.1 | — | — | — | — | — |
| Glass | | | | | | |
| 1100 | 93.3 | 37.9 | 84.3 | 85.0 | 80.5 | 78.4 |
| 1800 | 94.1 | 60.3 | 87.7 | 87.7 | 83.6 | 83.1 |
| Glass-Ceramic | | | | | | |
| 1100 | 58.6 | 17.3 | 26.8 | 46.1 | 39.1 | 22.8 |
| 1800 | 70.7 | 44.7 | 53.9 | 64.9 | 58.6 | 49.5 |

| | 7 | 8 | 9 | 10 | 11 | 12 |
|---|---|---|---|---|---|---|
| $Fe_3O_4$ | 0.5 | 0.1 | 0.1 | 0.25 | 0.25 | 0.4 |
| NiO | 0.2 | — | — | — | — | — |
| $Na_2O$ | — | N | — | N | N | N |
| Sucrose | — | — | — | — | — | — |
| CaO | A | A | A | A | L | A |
| Glass | | | | | | |
| 1100 | 40.3 | 91.5 | 77.2 | 88.9 | 88.9 | |
| 1800 | 59.3 | 93.2 | 85.6 | 92.0 | 91.9 | |
| Glass-Ceramic | | | | | | |
| 1100 | 11.3 | 57.9 | 39.8 | 55.2 | 60.6 | |
| 1800 | 35.7 | 73.4 | 62.9 | 72.8 | 76.5 | |

| | 13 | 14 | 15 | 16 | 17 | 18 |
|---|---|---|---|---|---|---|
| $Fe_3O_4$ | 0.25 | 0.25 | — | — | — | — |
| $Fe_2O_3$ | — | — | 0.25 | — | — | — |
| NiO | — | — | — | 0.1 | — | — |
| $Co_3O_4$ | — | — | — | — | 0.05 | — |
| $Na_2O$ | — | N | — | N | N | N |
| CaO | A | A | A | A | A | A |
| $Sb_2O_3$ | — | 0.1 | — | — | — | 0.1 |
| Glass | | | | | | |
| 1100 | 64.4 | 91.5 | 67.3 | 88.2 | 89.2 | 93.3 |
| 1800 | 78.4 | 93.3 | 80.0 | 89.4 | 84.3 | 94.1 |
| Glass-Ceramic | | | | | | |
| 1100 | 31.5 | 66.2 | 32.9 | 51.2 | 58.6 | 71.8 |
| 1800 | 57.3 | 79.4 | 57.7 | 68.2 | 61.8 | 83.7 |

*Crystallized according to the following heat treatment schedule:

Room temperature to 680° C. at 300° C./hour;
Hold at 680° C. for 1 hour;
680° C. to 720° C. at 300° C./hour;
Hold at 720° C. for 2 hours; and
Cool to room temperature at furnace rate to yield highly crystalline articles of relatively fine-grained crystal (average size is longest dimension of about 1 μm).

As is immediately evident from a review of Table I, absorption is much greater where the melting conditions are mildly reducing, rather than oxidizing.

Radiation-induced heat-up rates in vacuum were determined on a number of the examples of Table I and those results are graphically depicted in the appended drawing. The heating source contained within a glass bell jar was a bank of two 500 watt tungsten halogen lamps whose radiation was incident on one side of the samples. The measurement consisted of the time required to heat the samples from room temperature to about 280° C. The sample temperatures were measured utilizing an Omega OS36 Series Infrared Thermocouple. This non-contact device has a 130° field of view for target distances up to 0.5" (~1.3 cm), a spectral response from 6.5–14 μm, and a response time of 80 ms. The temperature range for the unit used, viz., an OS36-J-440F, was 170°–250° C. (±2%) or 140°–280° C. (±5%). The samples were held at one corner via an insulated clamp and were centered over and at a distance of 4.9 cm above the two tungsten halogen lamps. The infrared thermocouple was positioned a distance of 0.3 cm behind the samples and, hence, read the back surface temperature of the sample. A shutter interposed between the samples and the lamps allowed the lamps to reach their equilibrium temperature prior to the samples being actually exposed to the radiation. The pressure in the chamber during the measurements was about 40 μm of Hg. The results of those determinations are reported in the appended drawing along with measurements of a sample of NiP/Al. In each instance the precursor glass article had been crystallized to a glass-ceramic through one of the following heat treatment procedures:

Heat Treatment 1

Room temperature to 600° C. at 300° C./hour;
Hold at 600° C. for 1 hour;
600° to 850° C. at 300° C./hour;
Hold at 850° C. for 2 hours; and
Cool at room temperature at furnace rate to yield a glass-ceramic body containing canasite as the predominant crystal phase.

or

Heat Treatment 2

Room temperature to 680° C. at 300° C./hour;
Hold at 680° C. for 1 hour;
680° C. to 720° C. at 300° C./hour;
Hold at 720° C. for 2 hours; and
Cool to room temperature at furnace rate to yield a relatively fine-grained glass-ceramic body containing canasite as the predominant crystal phase.

The drawing graphically records the time in seconds for the samples to reach at least 280° C. The measurements were begun at about 170° C. Curve A designates the base glass; curve B the base glass crystallized to a glass-ceramic utilizing Heat Treatment 1; and curve C the base glass crystallized to a glass-ceramic employing Heat Treatment 2; all samples being free of $Co_3O_4$, $Fe_2O_3$, or NiO. Curve D designates the NiP/Al material. Curve E designates Example 10 crystallized in accordance with Heat Treatment 1. Curve F designates Example 13 crystallized in accordance with Heat Treatment 1. Curve G designates Example 6 crystallized in accordance with Heat Treatment 2. Curve H designates Example 3 crystallized in accordance with Heat Treatment 1. Curve I designates Example 12 crystallized in accordance with Heat Treatment 1. Curve J designates Example 6 crystallized in accordance with Heat Treatment 1. Curve K designates Example 7 crystallized in accordance with Heat Treatment 1.

An inspection of the drawing immediately evidences that, depending upon the crystal size, which, in turn, is dependent upon the crystallizing procedure, the undoped glass-ceramic can heat up at about the same rate as NiP/Al, whereas the samples doped with iron and/or nickel can heat up more than twice as rapidly as NiP/Al, particularly in those instances where the melting of the precursor glass was carried out under reducing rather than oxidizing conditions (compare Examples 10 and 13).

The laboratory apparatus for measuring the rate of cooling of the sample was similar to that described above for conducting the heat-up determinations, except that the samples were heated to about 270° C. and the shutter then closed to isolate the samples from the lamps. That practice resulted in one side of the samples seeing an aluminum shutter at a temperature of about 50° C. with the other side seeing a glass bell jar at a temperature of about 20° C. during the cooling. The doped glass-ceramic samples cool up to about twice as rapidly as NiP/Al. Nevertheless, because the glass-ceramic materials can be safely heated to temperatures much higher than NiP/Al, the temperature at film deposition can be matched with that of NiP/Al.

Table II reports a base glass composition, expressed in terms of weight percent on the oxide basis, illustrative of glasses in the soda lime silica (SLS) system; a base glass composition, expressed in terms of weight percent on the oxide basis, illustrative of glasses in the alkali metal aluminosilicate (AAS) system; and a base glass composition, expressed in terms of weight percent on the oxide basis, illustrative of glasses in the alkali metal borosilicate (ABS) system. Compounding, mixing, and melting of the glass batches in platinum crucibles were conducted in like as outlined above with respect to the glasses recorded in Table I. The soda lime silica glass batches were melted for 4 hours at 1550° C. and the resulting slabs annealed at 600° C. The alkali metal aluminosilicate glasses were melted for 8 hours at 1625° C. and annealed at 650° C. The alkali metal borosilicate glasses were melted for 8 hours at 1625° C. and annealed at 600° C. Aragonite was not used as a batch material nor was $NaNO_3$. Sucrose in an amount of 0.5% by weight was included in each batch to assure reducing conditions.

|  | SLS | AAS | ABS |
|---|---|---|---|
| $SiO_2$ | 71.0 | 63.0 | 72.0 |
| $Al_2O_3$ | 1.5 | 14.0 | 4.5 |
| $Na_2O$ | 13.0 | 14.0 | 6.0 |
| $K_2O$ | 1.0 | — | 0.5 |
| CaO | 9.5 | — | 0.5 |
| MgO | 4.0 | — | — |
| $Li_2O$ | — | 5.0 | — |
| $ZrO_2$ | — | 4.0 | — |
| $B_2O_3$ | — | — | 10.0 |
| ZnO | — | — | 3.0 |
| BaO | — | — | 3.5 |

TABLE III records additions of $Fe_2O_3$, NiO, and $Co_3O_4$ in weight percent. 1% by weight $As_2O_3$ was included in the alkali metal aluminosilicate (AAS) glasses and the alkali metal borosilicate (ABS) glasses as a fining agent. Table III also recites the transmittances of the glasses at wavelengths of 1100 nm and 1800 nm, respectively, as measured on samples with polished surfaces having the dimensions of 1"×1"×1 mm (~25.4×25.4×1 mm).

TABLE III

|  | SLS 19 | SLS 20 | SLS 21 | SLS 22 | SLS 23 |
|---|---|---|---|---|---|
| $Fe_2O_3$ | — | 0.5 | 1.2 | — | — |
| NiO | — | — | — | 0.2 | ∞ |
| $Co_3O_4$ | — | — | — | — | 0.5 |
| $As_2O_3$ | — | — | — | — | — |
| 1100 | 89 | 39 | 13 | 44 | 84 |
| 1800 | 91 | 64 | 40 | 72 | 83 |

|  | AAS 24 | AAS 25 | AAS 26 | AAS 27 | AAS 28 |
|---|---|---|---|---|---|
| $Fe_2O_3$ | — | 0.5 | 1.2 | — | — |
| NiO | — | — | — | 0.1 | — |
| $Co_3O_4$ | — | — | — | — | 0.05 |
| $As_2O_3$ | 1.0 | 1.0 | 1.0 | 1.0 | 1.0 |
| 1100 | 93 | 66 | 40 | 87 | 89 |
| 1800 | 93 | 81 | 66 | 88 | 85 |

|  | ABS 29 | ABS 30 | ABS 31 | ABS 32 | ABS 33 |
|---|---|---|---|---|---|
| $Fe_2O_3$ | — | 0.5 | 1.2 | — | — |
| NiO | — | — | — | 0.2 | — |
| $Co_3O_4$ | — | — | — | — | 0.05 |
| $As_2O_3$ | 1.0 | 1.0 | 1.0 | 1.0 | 1.0 |
| 1100 | 91 | 49 | 21 | 39 | 82 |
| 1800 | 91 | 68 | 48 | 68 | 81 |

As can be observed from an inspection of Tables II and III, additions of iron oxide, nickel oxide, and cobalt oxide boost the energy absorptance of the glasses.

We claim:

1. In a magnetic memory storage device comprising a head pad and a rigid information disc, said disc comprising a rigid substrate having a layer of magnetic media joined to the surface of said substrate through an underlayer, wherein said substrate consists of a glass-based material, the improvement which comprises including 0.05-2% by weight total of at least one member of the group consisting of cobalt oxide, iron oxide, and nickel oxide in the composition of said glass-based material.

2. A magnetic storage device according to claim 1 wherein said glass-based material consists of a glass-ceramic wherein crystals exhibiting a chain silicate structure or a sheet silicate structure comprise the predominant crystal phase.

3. A magnetic storage device according to claim 2 wherein said crystals exhibit a chain silicate structure and are selected from the group consisting of predominantly canasite, predominantly potassium fluorrichterite, and predominantly potassium fluorrichterite, but also containing a substantial amount of cristobalite.

4. A magnetic memory storage device according to claim 3 wherein said crystals consist predominantly of canasite and have a composition consisting essentially, expressed in terms of weight percent on the oxide basis, of

| SiO$_2$ | 50-70 | MgO | 0-2 |
|---|---|---|---|
| CaO | 15-25 | ZnO | 0-2 |
| Na$_2$O | 6-10 | SnO$_2$ | 0-2 |
| K$_2$O | 6-12 | Sb$_2$O$_3$ | 0-1 |
| Al$_2$O$_3$ | 1-4 | F | 4-9. |

5. A magnetic memory storage device according to claim 3 wherein said crystals consist predominantly of potassium fluorrichterite and has a composition consisting essentially, expressed in terms of weight percent on the oxide basis, of

| SiO$_2$ | 58-70 | K$_2$O | 3.8-7 |
|---|---|---|---|
| Al$_2$O$_3$ | 0.5-3 | Li$_2$O | 0.5-2 |
| MgO | 13-17.5 | BaO | 0-2.5 |
| CaO | 3-7 | P$_2$O$_5$ | 0-2.5 |
| Na$_2$O | 1.5-4 | F | 3-5.5. |

6. A magnetic memory storage device according to claim 3 wherein said crystals consist predominantly of potassium fluorrichterite, but also consist of a substantial amount of cristobalite, and have a composition consisting essentially, expressed in terms of weight percent on the oxide basis, of

| SiO$_2$ | 65-69 | K$_2$O | 4.2-6 |
|---|---|---|---|
| Al$_2$O$_3$ | 0.75-3 | Li$_2$O | 0.5-2 |
| MgO | 13.5-16.5 | BaO | 0-2 |
| CaO | 3-4.8 | P$_2$O$_5$ | 0-2 |
| Na$_2$O | 1.5-3.3 | F | 3.3-5. |

7. A magnetic memory storage device according to claim 2 wherein said crystals exhibit a sheet silicate structure and are selected from the group consisting of predominantly fluorophlogopite solid solution and predominantly tetrasilicic fluormica.

8. A magnetic memory storage device according to claim 7 wherein said crystals consist predominantly of fluorophlogopite solid solution and have a composition consisting essentially, expressed in terms of weight percent on the oxide basis, of

| SiO$_2$ | 25-60 | Cs$_2$O | 0-20 |
|---|---|---|---|
| B$_2$O$_3$ | 5-15 | Na$_2$O + K$_2$O + Rb$_2$O + Cs$_2$O | 2-20 |
| Al$_2$O$_3$ | 5-25 | MgO | 4-25 |
| B$_2$O$_3$ + Al$_2$O$_3$ | 15-35 | Li$_2$O | 0-7 |
| Na$_2$O | 0-15 | MgO + Li$_2$O | 6-25 |
| K$_2$O | 0-15 | F | 4-20. |
| Rb$_2$O | 0-15 | | |

9. A magnetic memory storage device according to claim 7 wherein said crystals consist predominantly of tetrasilicic fluormica and have a composition consisting essentially, expressed in terms of weight percent on the oxide basis, of 45-70% SiO$_2$, 8-20% MgO, 8-15% MgF$_2$, 5-25% R$_2$O, wherein R$_2$O consists of 0-20% K$_2$O, 0-20% Rb$_2$O, and 0-20% Cs$_2$O, 0-20% RO, wherein RO consists of 0-20% SrO, 0-20% BaO, and 0-20% CdO, and 5-35% R$_2$O+RO.

10. A magnetic memory storage device according to claim 1 wherein said glass-based material contains 0.2-0.5% total of at least one member of the group consisting of cobalt oxide, iron oxide, and nickel oxide.

11. A magnetic memory storage device according to claim 1 wherein said glass-based material consists of a glass having a base composition selected from the group of glasses within the soda lime silica system, glasses within the alkali metal aluminosilicate system, and glasses within the alkali metal borosilicate system.

12. In a rigid information disc for use in a magnetic memory storage device comprising a substrate having a layer of magnetic media joined to the surface of said substrate through an underlayer wherein said substrate consists of a glass-based material, the improvement which comprises including 0.05-2% by weight total of at least one member of the group consisting of cobalt oxide, iron oxide, and nickel oxide in the composition of said glass-based material.

13. A rigid information disc according to claim 12 wherein said glass-based material consists of a glass-ceramic wherein crystals exhibiting a chain silicate structure or a sheet silicate structure comprise the predominant crystal phase.

14. A rigid information disc according to claim 13 wherein said crystals exhibit a chain silicate structure and are selected from the group consisting of predominantly canasite, predominantly potassium fluorrichterite, and predominantly potassium fluorrichterite, but also containing a substantial amount of cristobalite.

15. A rigid information disc according to claim 14 wherein said crystals consist predominantly of canasite and have a composition consisting essentially, expressed in terms of weight percent on the oxide basis, of

| SiO$_2$ | 50-70 | MgO | 0-2 |
|---|---|---|---|
| CaO | 15-25 | ZnO | 0-2 |
| Na$_2$O | 6-10 | SnO$_2$ | 0-2 |
| K$_2$O | 6-12 | Sb$_2$O$_3$ | 0-1 |
| Al$_2$O$_3$ | 1-4 | F | 4-9. |

16. A rigid information disc according to claim 14 wherein said crystals consist predominantly of potassium fluorrichterite and has a composition consisting essentially, expressed in terms of weight percent on the oxide basis, of

| SiO$_2$ | 58-70 | K$_2$O | 3.8-7 |
|---|---|---|---|
| Al$_2$O$_3$ | 0.5-3 | Li$_2$O | 0.5-2 |
| MgO | 13-17.5 | BaO | 0-2.5 |
| CaO | 3-7 | P$_2$O$_5$ | 0-2.5 |
| Na$_2$O | 1.5-4 | F | 3-5.5. |

17. A rigid information disc according to claim 14 wherein said crystals consist predominantly of potassium fluorrichterite, but also consist of a substantial amount of cristobalite, and have a composition consisting essentially, expressed in terms of weight percent on the oxide base, of

| SiO$_2$ | 65-69 | K$_2$O | 4.2-6 |
|---|---|---|---|
| Al$_2$O$_3$ | 0.75-3 | Li$_2$O | 0.5-2 |
| MgO | 13.5-16.5 | BaO | 0-2 |
| CaO | 3-4.8 | P$_2$O$_5$ | 0-2 |
| Na$_2$O | 1.5-3.3 | F | 3.3-5. |

18. A rigid information disc according to claim 13 wherein said crystals exhibit a sheet silicate structure and are selected from the group consisting of predominantly fluorophlogopite solid solution and predominantly tetrasilicic fluormica.

19. A rigid information disc according to claim 18 wherein said crystals consist predominantly of fluorophlogopite solid solution and have a composition consisting essentially, expressed in terms of weight percent on the oxide basis, of

| | | | |
|---|---|---|---|
| $SiO_2$ | 25–60 | $Cs_2O$ | 0–20 |
| $B_2O_3$ | 5–15 | $Na_2O + K_2O + Rb_2O + Cs_2O$ | 2–20 |
| $Al_2O_3$ | 5–25 | $MgO$ | 4–25 |
| $B_2O_3 + Al_2O_3$ | 15–35 | $Li_2O$ | 0–7 |
| $Na_2O$ | 0–15 | $MgO + Li_2O$ | 6–25 |
| $K_2O$ | 0–15 | F | 4–20. |

20. A rigid information disc according to claim 18 wherein said crystals consist predominantly of tetrasilicic fluormica and have a composition consisting essentially, expressed in terms of weight percent on the oxide basis, of 45–70% $SiO_2$, 8–20% $MgO$, 8–15% $MgF_2$, 5–25% $R_2O$, wherein $R_2O$ consists of 0–20% $K_2O$, 0–20% $Rb_2O$, and 0–20% $Cs_2O$, 0–20% RO, wherein RO consists of 0–20% SrO, 0–20% BaO, and 0–20% CdO, and 5–35% $R_2O+RO$.

21. A rigid information disc according to claim 11 wherein said glass-based material consists of a glass having a base composition selected from the group of glasses within the soda lime silica system, glasses within the alkali metal aluminosilicate system, and glasses within the alkali metal borosilicate system.

22. A rigid information disc according to claim 11 wherein said glass-based material contains 0.2–0.5% total of at least one member of the group consisting of cobalt oxide, iron oxide, and nickel oxide.

* * * * *